United States Patent [19]

Machida

[11] 4,062,506
[45] Dec. 13, 1977

[54] TAPE CASSETTE WITH FEATURES FOR PREVENTING THE TAPE FROM MOVING UP OR DOWNWARDLY RELATIVE TO THE CASSETTE

[75] Inventor: Tetsuo Machida, Tagajyo, Japan

[73] Assignee: Sony Corporation, Tokyo, Japan

[21] Appl. No.: 701,678

[22] Filed: July 1, 1976

[30] Foreign Application Priority Data

July 23, 1975 Japan .......................... 50-102221[U]

[51] Int. Cl.$^2$ ...................... G03B 1/04; G11B 15/32; G11B 23/04
[52] U.S. Cl. ...................................... 242/199; 360/132
[58] Field of Search ................... 242/188, 197–200, 242/55.19 A; 352/72–78 R; 226/196; 360/96, 132

[56] References Cited

U.S. PATENT DOCUMENTS

| 3,432,111 | 3/1969 | Ryder | 242/199 |
| 3,666,203 | 5/1972 | Sato et al. | 242/188 |
| 3,796,394 | 3/1974 | Souza | 242/199 |

Primary Examiner—Leonard D. Christian
Attorney, Agent, or Firm—Hill, Gross, Simpson, Van Santen, Steadman, Chiara & Simpson

[57] ABSTRACT

A novel tape cassette which has tape guides that prevent the tape from moving upwardly or downwardly in the cassette and which are constructed by providing interleafed guides which are formed by molding from opposite sides of the top and lower half of the cassette during construction. It has been discovered that the tape guides molded in plastic cassettes tend to incline or tilt away from the front edge of the cassette which result in the tape moving upward or downwardly as it engages such inclined tape guides. The present invention provides for forming a portion of the guides from the upper half of the cassette and other portions of the guides formed from the lower cassette half such that the combination of the upper and lower guides interleaf and result in the tape being maintained in the desired center relationship while traveling in either direction.

5 Claims, 10 Drawing Figures

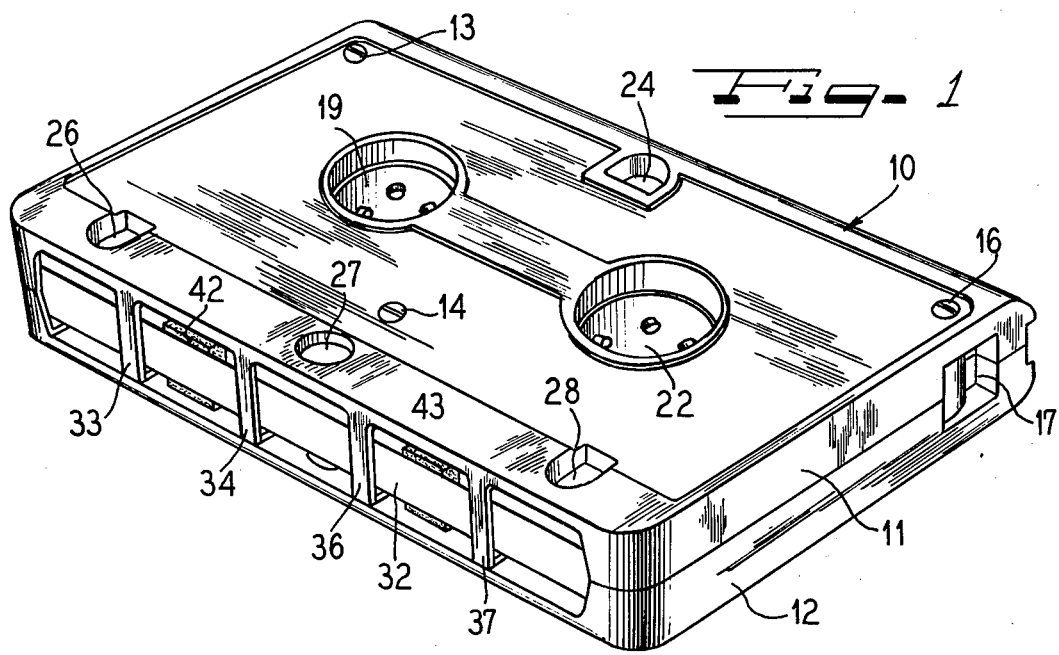
Fig-1
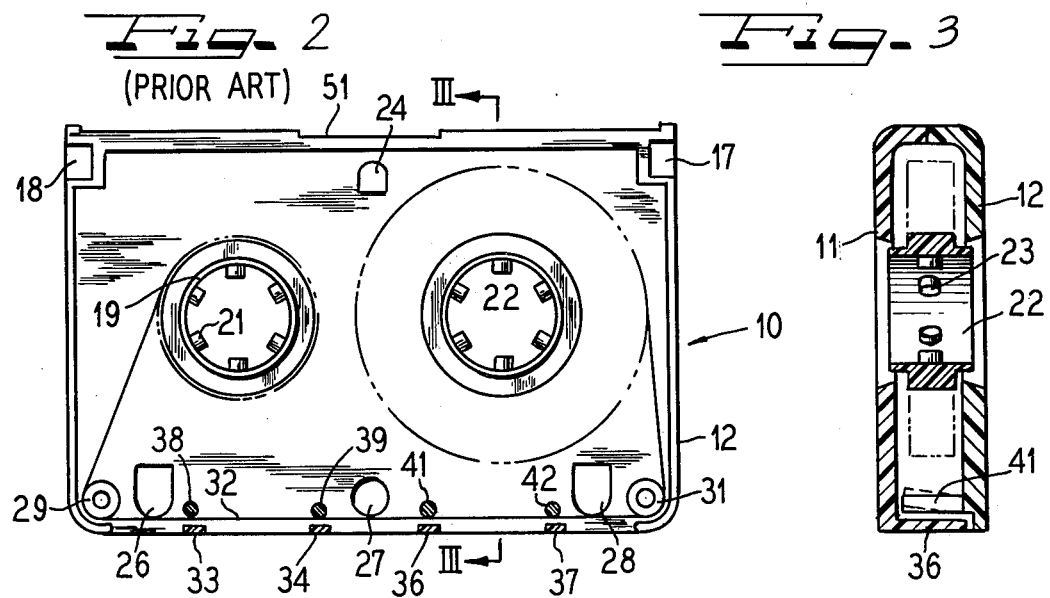
Fig-2 (PRIOR ART)
Fig-3

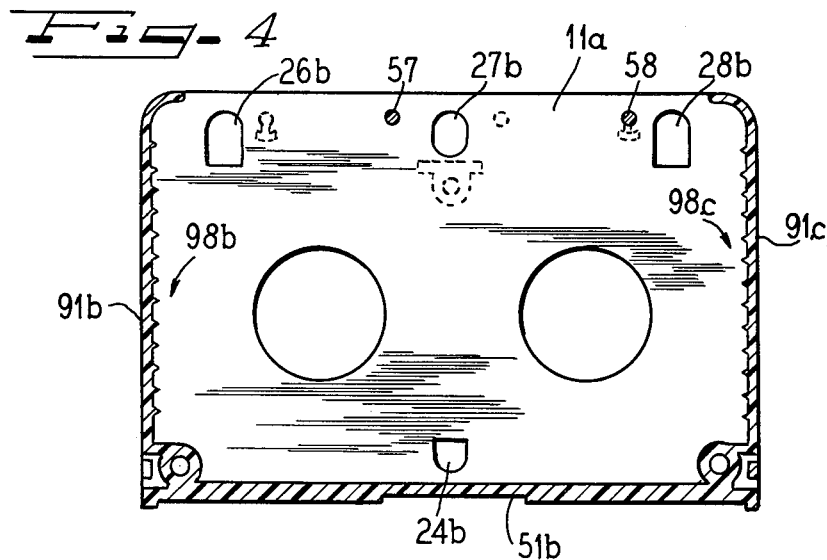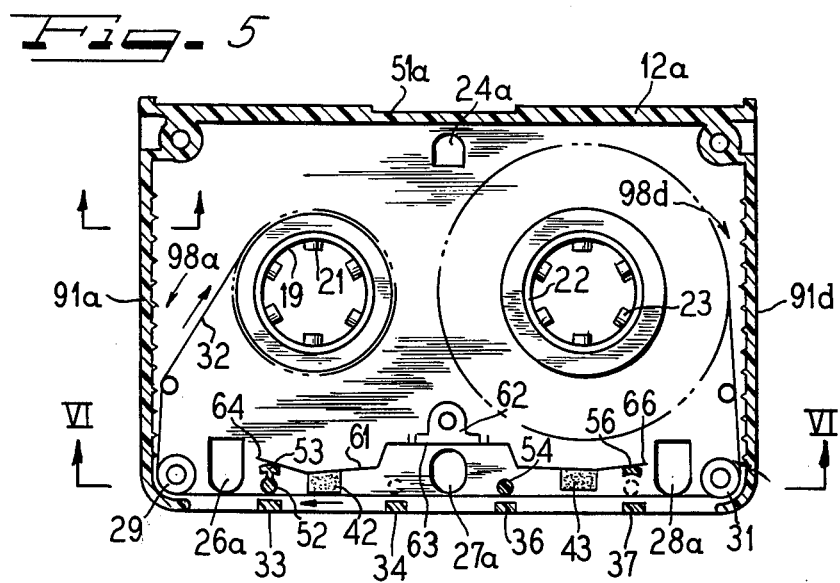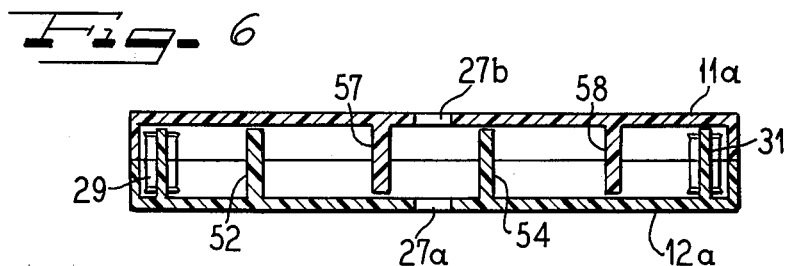

U.S. Patent  Dec. 13, 1977  Sheet 3 of 3  4,062,506
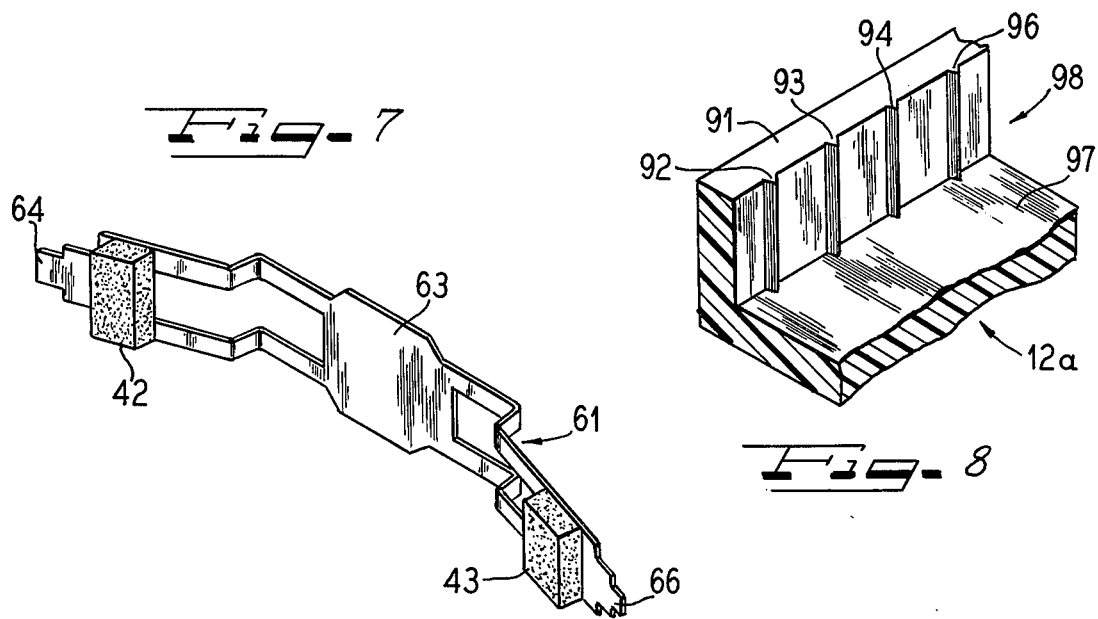
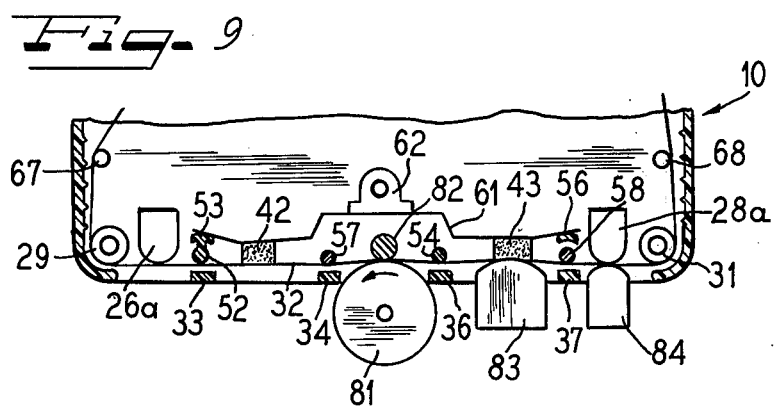
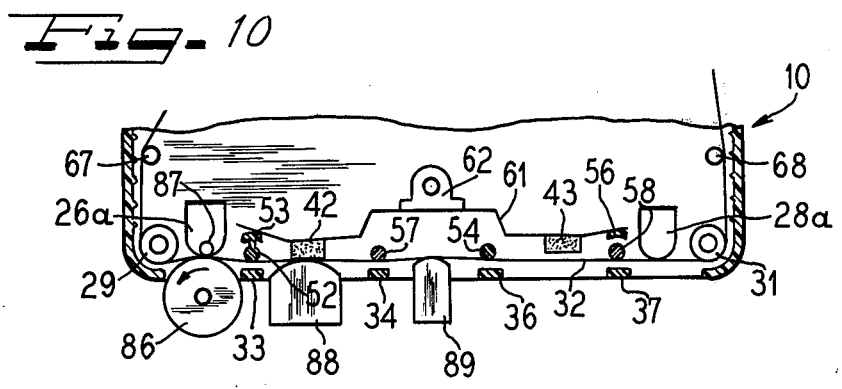

TAPE CASSETTE WITH FEATURES FOR PREVENTING THE TAPE FROM MOVING UP OR DOWNWARDLY RELATIVE TO THE CASSETTE

BACKGROUND OF THE INVENTION

1. Field of the Invention

This invention relates in general to tape cassettes and in particular to a novel tape cassette.

2. Description of the Prior Art

In prior art tape cassettes the front tape guides which guide the tape by the magnetic heads are generally molded on either the upper or lower cassette half as one unit and are designed to guide the tape passed the front edge portion of the cassette. The cassette is normally made of plastic synthetic resin and it has been found that the guides incline or tilt backwardly after being removed from the mold in which the cassette housings are formed. The guides tend to tilt toward the inside direction of the cassette housing perhaps because the guides thermally shrink after being removed from the mold. For example if the guide is 4 mm in height, the free end of the guide is misaligned by 40 microns inwardly of the housing.

Thus, the prior art machines have utilized guide members extending from one side of the cassette which tilt backwardly into the confines of the cassette and thus result in the tape being transported in a manner which tends to bias it up or down in the cassette or tends to cause it to wave in one direction which is undesirable and will result in the tape being urged toward the bottom or top wall of the cassette housing depending upon the angle of tilt and the side from which the pins extend.

Thus, also when the cassette is turned over for recording or reproducing a signal on the other side of the tape, the tape will also be biased or urged against the same side wall of the cassette which causes the magnetic head to be misaligned with the magnetic track on the tape which causes the reproduction to be of poor quality. This of course presents a large problem for recording or reproducing signals with the proper high quality sound which is desired.

SUMMARY OF THE INVENTION

Therefore, the present invention provides molding tape guides partially on the upper cassette half and partially on the lower cassette half with approximately one-half of the guides on the upper cassette half and the other half on the lower cassette half and with the guides spaced so that they interleaf between each other. In a particular embodiment two guides extend from the upper half and two guides extend from the lower half with the guides interleafed between each other such that even if each guide tilts inwardly the tape will pass and be maintained in the center portion of the cassette by the tape guides which causes the magnetic recording and/or reproducing head to engage the tape in the desired position.

Another feature of the invention is that the head pads are supported by a leaf spring which is attached to one half of the cassette by guides which are molded into the cassette. One supporting guide extends from the tape guide on one side and the other supporting guide is mounted symmetrically in the cassette and a center support guide engages the center of the spring and thus the spring is supported between the guides under a spring biasing force.

Another feature of the invention is providing a plurality of projections on the inside walls of the cassette housing so as to prevent the magnetic tape from sticking. The various thin film tapes used with micro-cassettes tend to stick to the walls as the tape becomes slack particularly under humid conditions. Also during molding of the cassette housing a silicon type oil is used for removing the cassettes from the mold which sometimes remains on the wall surfaces and causes the magnetic tape to stick thereto. The projections prevent such sticking.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a perspective view of a cassette according to the invention;

FIG. 2 is a top plan view of a prior art cassette;

FIG. 3 is a sectional view taken along line III—III in FIG. 2;

FIG. 4 is a sectional view through the cassette;

FIG. 5 is a sectional view through the cassette illustrating certain of the internal parts mounted therein;

FIG. 6 is a sectional view taken along line VI—VI in FIG. 5;

FIG. 7 is a detailed perspective view of the pad supporting spring;

FIG. 8 is an enlarged detailed view taken on section lines VIII—VIII from FIG. 5;

FIG. 9 is a partially cut-away sectional top view through the cassette illustrating the pinch roll and recording heads; and FIG. 10 illustrates a partial sectional view showing a pinch roller of the side type.

DESCRIPTION OF THE PREFERRED EMBODIMENTS

FIGS. 1, 2 and 3 illustrate cassettes of the prior art. The cassette 10 is made of two halves 11 and 12 which are held together by bolts 13, 14 and 16. Feeler openings 17 and 18 are formed near the rear wall of the cassette so as to prevent erasure of the tape if desired. Reels 19 and 22 are rotatably supported in the cassette and have projections 21 and 23 for tape drive and rewind. Openings 24, 26 and 28 extend through both halves of the cassette and corner guide rollers 29 and 31 are mounted adjacent the front edge of the cassette and the tape 32 passes over them and by the vertical guides 33, 34, 36 and 37. Extending upwardly from the lower half 12 of the cassette are guide members 38, 39, 41 and 42 all of which are attached to the lower half 12 and extend upwardly therefrom and are of generally cylindrical shape. A rear spring receiving notch 51 is formed in the rear of the cassette to hold it in the tape machine.

With such prior art tape cassettes, the tape guides 38, 39, 41 and 42 which are attached to only one of the halves 12 of the cassette tend to have their ends away from the base which is attached to the cassette half 12 bent or inclined into the body of the cassette as shown in FIG. 3 in dotted line. Generally, such guides in micro-cassettes are about 4 mm in height and the top of the guides is shifted or displaced upwardly relative to FIG. 3 by about 40 microns. This is caused primarily due to heat shrinking as the cassette halves are removed from the mold in which the cassette halves are formed and during cooling the guide bend as shown in FIG. 3 in dotted line.

FIGS. 4, 5 and 6 illustrate the invention in which the cassette halves 11a and 12a are formed with openings 26, 27, 28 and 24 and support reels 19 and 22 upon which the tape 32 is carried. Behind the protector members 33, 34, 36 and 37 are mounted guide members 52 and 54 which extend upwardly relative to FIG. 6 from the bottom half 12a of the cassette. Additional guide members 57 and 58 extend downwardly relative to FIG. 6 from the cassette half 11a and the guide members 52, 57, 54 and 58 are interleaved between each other as shown in FIG. 6. When the tape rides against the surface of the guides, 52, 57, 54 and 58 it will ride in the center of the cassette between the cassette halves 11a and 12a because the top ends relative to FIG. 6 of guide members 52 and 54 will be bent back into the cassette due to heat shrinking whereas the lower ends relative to FIG. 6 of guides 57 and 58 will be bent into the cassette. The result is that the bending of guides 52 and 54 will be compensated for by the bending of guides 57 and 58 such that the tape 32 will run in the center relative to FIG. 6 of the front opening in the cassette such that magnetic heads will maintain alignment with the tape and, thus, improved reproduction will occur.

Also, when the tape is turned over for recording or reproducing a signal on its other side the tape will be biased toward the center of the cassette and proper alignment will exist thus allowing the recording and reproduction of signals with high fidelity.

Thus, in accordance with the present invention the tape guides 57 and 58 are molded and extend downwardly from the upper cassette 11a whereas the tape guides 12 and 54 extend upwardly and are molded from the lower cassette half 12a as shown in FIGS. 4, 5 and 6.

Even though each of the guides tilts inwardly, the tape will pass at the center of the cassette and exact alignment with magnetic recording and/or reproducing heads will be obtained.

Wiper pads 42 and 43 are mounted on a leaf spring 61 as illustrated in perspective view in FIG. 7 and have end tabs 64 and 66 at its opposite ends which engage spring guides 53 and 56. A center spring engaging member 62 is formed in the cassette and the spring is held between the guides 53, 56 and member 62 as shown in FIG. 5, for example. As the tape 32 passes the wiper pads 42 and 43, it will be wiped and cleaned by the pads 42 and 43. The guide 53 is attached to and extends from the guide 52 and guide 56 is symmetrically spaced relative to guide 53. The spring 61 is maintained between the spring support 62, 53 and 56 due to spring tension in the spring.

On the side walls 91a and 91d of the lower half of the cassette 12a as well as the side walls 91b and 91c of the upper half 11a of the cassette are formed a number of projections 98a, 98d, 98b and 98c. As shown in greater detail in FIG. 8, the projections 98 may comprise a number of individual projections 92, 93, 94 and 96 which extend from the side wall 91 adjacent the bottom wall 97 of the cassette. The projections 98 engage the tape 32 and prevent it from sticking to the side walls of the cassette. The very thin film tape used with Micro Cassettes tends to stick to the walls when the tape is slack in the cassette housing due to high humidity conditions. Also, silicon oil is used for removing the molded cassette housings from the mold during manufacture and such oil remains on the wall surfaces and causes the magnetic tape to stick thereon. The projections 98 hold the tape away from the wall and prevents such sticking. Although the projections 92 through 93 are illustrated as triangular in cross-section in FIG. 8 it is to be realized, of course, that they may be rounded or of any suitable shape so as to hold the tape away from the side walls 91 of the cassette.

It is seen that this invention provides for a proper alignment in tape cassettes by forming tape guides from opposite halves of the cassette such that they interleaf between each other which provides accurate guiding of the tape. The invention also encompasses a novel leaf spring and support for head pads and projections on the side walls of the cassette for preventing sticking.

FIG. 9 is a sectional view illustrating the cassette of the invention in use with a center pinch roll 81 and center capstan 82 which extends through the opening 27. Magnetic heads 83 and 84 are mounted so as to engage the tape 32.

FIG. 10 illustrates a side drive with a pinch roll 86 which engages a capstan 87 that passes through opening 26 in the cassette and magnetic heads 88 and 89 are mounted so as to engage the tape 32.

Although the invention has been described with respect to preferred embodiments it is not to be so limited as changes and modifications may be made which are within the full intended scope as defined by the appended claims.

I claim as my invention:

1. A tape cassette having a pair of parallel lower and upper cassette halves, a pair of tape reels disposed side by side in a common plane between said halves and a magnetic tape would onto at least one of said reels comprising:
   a. tape guide rollers for defining at least part of the tape transport path; and
   b. a plurality of tape guides formed on said cassette halves with a first group of said tape guides formed on said lower half and another group of said guides formed on said upper half and said tape guide project from said cassette halves so that tape guides of said first group interleave with tape guides of said second group, and said magnetic tape engages surfaces of said first and another groups of said guides which hold it centered between said lower and upper cassette halves.

2. A tape cassette formed of molded plastic and having a pair of mating lower and upper cassette members and including a pair of tape reels rotatably mounted in said cassette with magnetic tape extending between said reels and having a portion available for recording and playback functions along a front sidewall of said cassette which has an open area, comprising a plurality of tape guides formed on said lower and upper cassette members and extending generally parallel to said front face of said cassette and providing guides for said tape at said front face and a first portion of said tape guides attached to said upper cassette member and a second portion of said tape guides attached to said lower cassette member and said first and second portions interleaved between each other such that said tape engages alternately guides from said first and second portions, and said first and second portions maintaining said tape centered between said lower and upper cassette members.

3. A tape cassette according to claim 2 wherein said first and second portions of said tape guides are circular in cross-section.

4. A tape cassette according to claim 2 wherein said tape guides are uniformly spaced along said front sidewall of said cassette.

5. A tape cassette according to claim 2 including a flexible wiper pad support member with at least one tape wiper pad mounted thereon.

* * * * *